United States Patent
Dropps et al.

(10) Patent No.: US 7,609,710 B1
(45) Date of Patent: Oct. 27, 2009

(54) METHOD AND SYSTEM FOR CREDIT MANAGEMENT IN A NETWORKING SYSTEM

(75) Inventors: Frank R. Dropps, Maple Grove, MN (US); Craig M. Verba, Maple Grove, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 169 days.

(21) Appl. No.: 12/019,094

(22) Filed: Jan. 24, 2008

(51) Int. Cl.
*H04L 12/56* (2006.01)

(52) U.S. Cl. .................. 370/412; 370/392; 709/232

(58) Field of Classification Search ................ None
See application file for complete search history.

(56) References Cited

U.S. PATENT DOCUMENTS

| | | | |
|---|---|---|---|
| 5,610,745 A * | 3/1997 | Bennett | 398/52 |
| 6,275,877 B1 * | 8/2001 | Duda | 710/23 |
| 7,372,812 B2 * | 5/2008 | Fujiyoshi | 370/231 |
| 7,418,001 B2 * | 8/2008 | Yun et al. | 370/412 |
| 2005/0008011 A1 * | 1/2005 | Georgiou et al. | 370/389 |

* cited by examiner

*Primary Examiner*—Hong Cho
*Assistant Examiner*—Robert C Scheibel
(74) *Attorney, Agent, or Firm*—Klein, O'Neill & Singh, LLP

(57) ABSTRACT

A method for credit management in a network system is provided. The method comprises receiving an incoming frame at a receive port of a network device; determining a frame length of the incoming frame; based on the frame length, determining whether to store the frame in a first memory storage space or a second memory storage space, wherein the first memory storage space includes a plurality of slots and each of the plurality of slots can store only one frame regardless of frame size; and the second memory storage space includes a plurality of slots and each of the plurality of slots can store more than one frame; and if the incoming frame is stored in the second memory storage space, transmitting a signal immediately to another port indicating that credit is available.

14 Claims, 9 Drawing Sheets

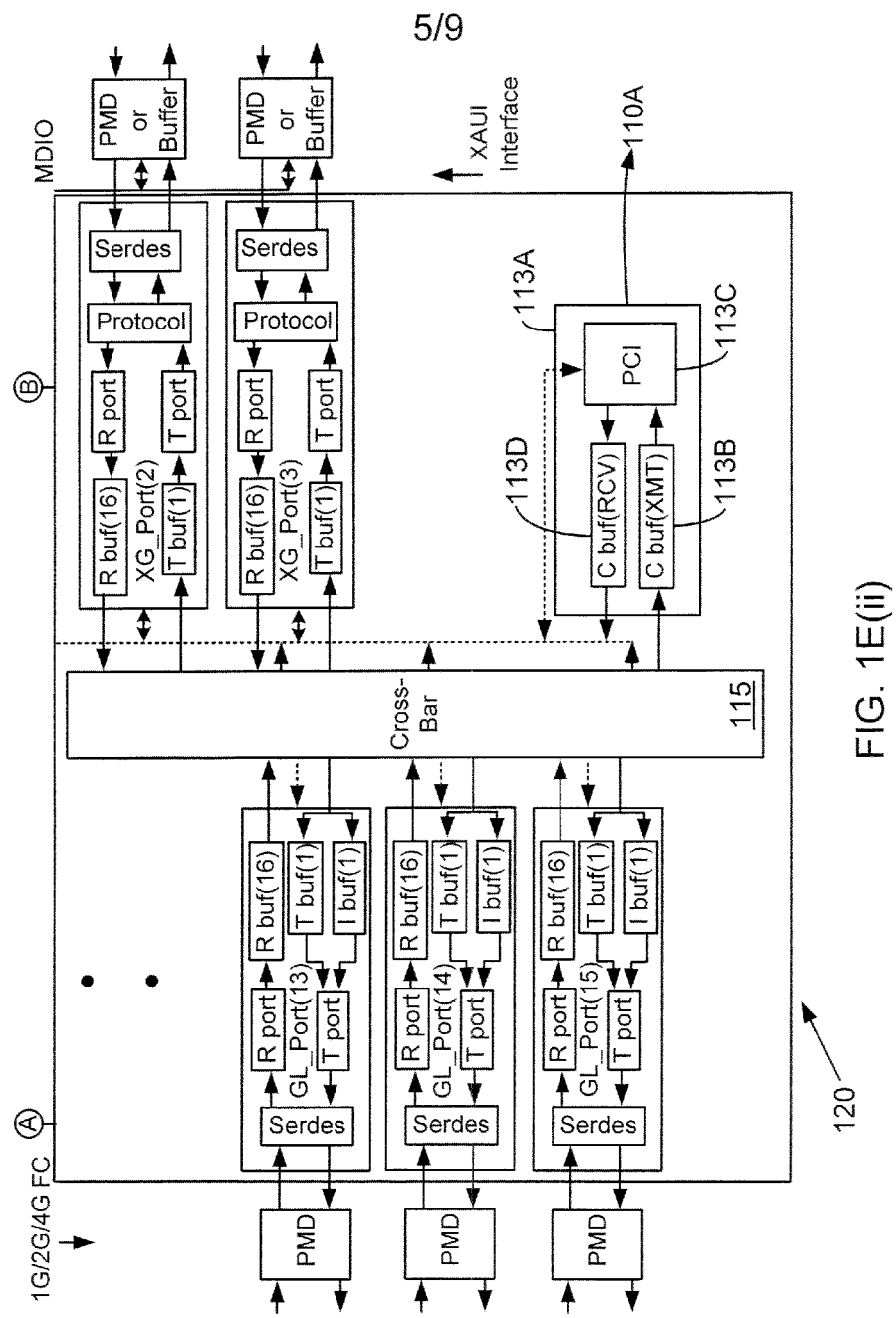
FIG. 1E(ii)

METHOD AND SYSTEM FOR CREDIT MANAGEMENT IN A NETWORKING SYSTEM

BACKGROUND

1. Technical Field

The present invention relates to networks, and more particularly, to credit management in network systems.

2. Related Art

Networks typically use frames or packets (used interchangeably through out this specification) to send information (or data) between network nodes. A network node is a port for a network device (for example, a switch, host bus adapter and others). A network node that transmits a frame may be designated as a "transmitting node" and a network node that receives a frame may be designated as a "receiving node"

Typically, before a transmitting node sends a frame to a receiving node, the transmitting node ensures that there is enough credit at the receiving node to receive and store the frame. The transmitting node and the receiving node may go through a handshake mechanism to determine if space (or credit) is available for a frame. The handshake mechanism is often determined by the network protocol/standard. For example, in a Fibre Channel network, the receiving node sends a primitive, R_RDY, to the transmitting node, to indicate availability of storage space (or buffer space) at the receiving node. After receiving the R_RDY primitive, the transmitting node transmits a frame to the receiving node.

Typically, when a receiving node receives a frame, the frame is stored (or staged) in a receive buffer (or memory storage space). The receive buffer includes a plurality of slots. The receive buffer allocates one slot for each frame, regardless of the frame size. For example, each entry in a receive buffer may be 2164 bytes, which is the maximum Fibre Channel frame size. A frame that is smaller in size than the maximum frame size (for example, 256 bytes) occupies the same slot as a maximum size frame. Therefore, buffer space utilization is inefficient in conventional network nodes.

Conventional network nodes have other shortcomings. For example, when a network node receives a larger frame (for example, 2164 bytes), the frame is stored in a slot of the receive buffer. Depending on the destination port, the received frame is moved to a transmit port for transmission. While the node is processing the larger frame, other short frames may arrive and fill up the receive buffer. This may cause a buffer overflow condition. The overflow condition may result in frames being dropped. This may affect overall network performance. The problem gets severe for network links that are longer, for example, more than one kilometer.

Therefore, there is a need to improve network frame processing and overall network node structure for handling frames of different sizes.

SUMMARY OF THE PRESENT INVENTION

In one embodiment, a method for credit management in a network system is provided. The method comprises receiving an incoming frame at a receive port of a network device; determining a frame length of the incoming frame; based on the frame length, determining whether to store the frame in a first memory storage space or a second memory storage space, wherein the first memory storage space includes a plurality of slots and each of the plurality of slots can store only one frame regardless of frame size; and the second memory storage space includes a plurality of slots and each of the plurality of slots can store more than one frame; and if the incoming frame is stored in the second memory storage space, transmitting a signal immediately to another port indicating that credit is available.

In another embodiment, a buffer structure for a network port is provided. The buffer structure comprises a frame monitoring logic for monitoring and determining a frame length of an incoming frame received at the network port; a first memory storage space that includes a plurality of slots, where each of the plurality of slots can store only one frame regardless of frame size; and a second memory storage space that includes a plurality of slots, where each of the plurality of slots can store more than one frame; wherein depending on the frame length, the incoming frame is either stored in the first memory storage space or the second memory storage space; and if the incoming frame is stored in the second memory storage space, a signal is immediately transmitted to another port indicating that credit is available to store more frames.

In yet another embodiment, a method for processing an incoming frame received at a receive port of a network device is provided. The method comprises determining if the incoming frame is to be processed at the receive port or if processing by the receive port is to be bypassed; and routing the incoming frame to an in-line credit extender for transmission to another port, if a bypass mode is enabled.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of the various embodiments. In the drawings, the same components have the same reference numerals. The illustrated embodiments are intended to illustrate, but not to limit the invention. The drawings include the following Figures.

DETAILED DESCRIPTION

Figure 1A:
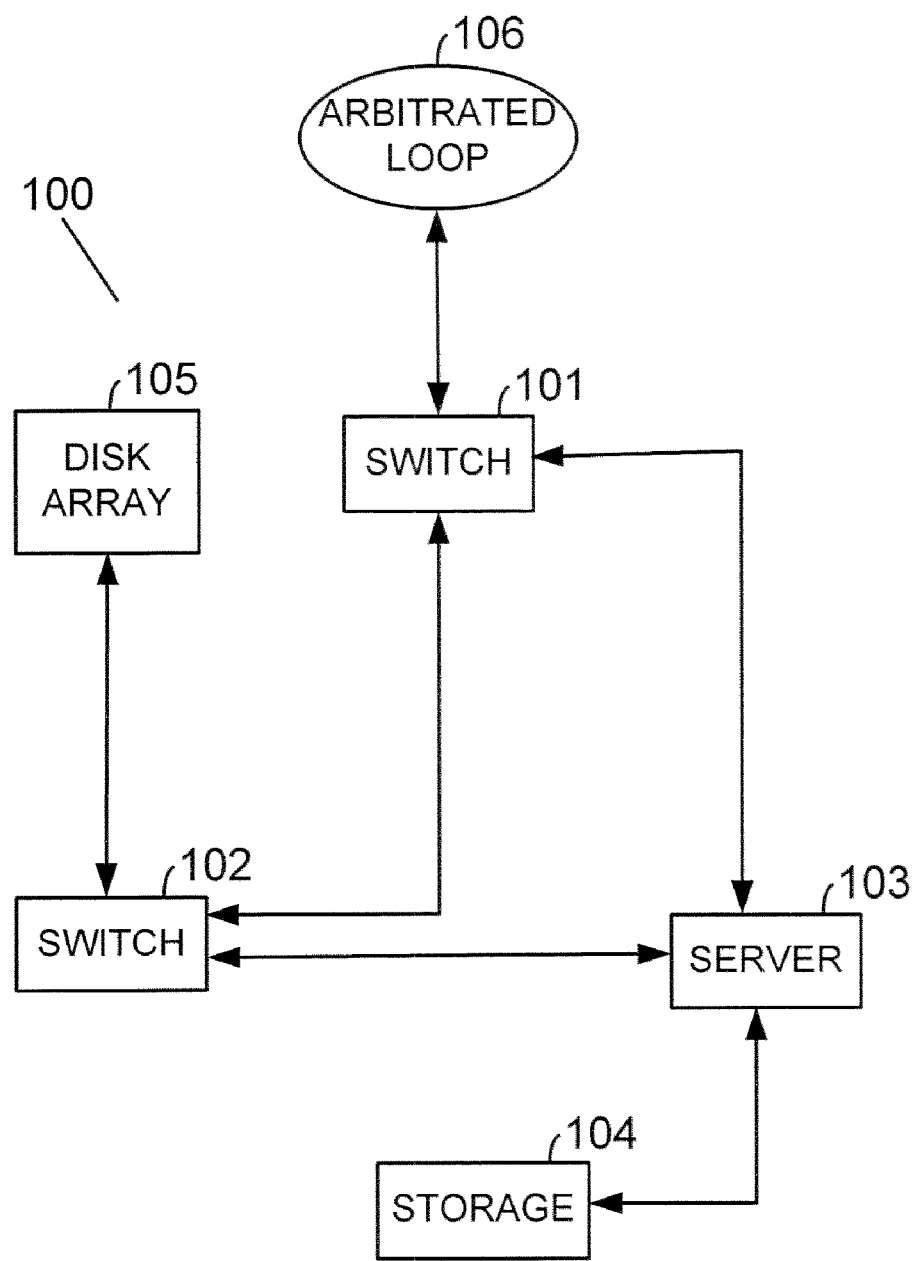
FIG. 1A shows an example of a network system, used according to one embodiment of the present disclosure.

Definitions:

The following definitions are provided as they are typically (but not exclusively) used in the Fibre Channel environment, implementing the various adaptive aspects of the present invention "Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices (NL_Port, N_ports etc.).

"FIFO": A first in first out buffer structure used for storing information.

"MUX" (Multiplexer): A hardware logic element that selects from a plurality of inputs depending on a select signal.

"Port": A general reference to N. Sub.--Port or F.Sub.--Port.

"R_RDY": A flow control primitive signal used for establishing credit. Receiving an R_RDY frame increases credit, while sending a R_RDY frame decreases credit.

"Switch": A fabric element conforming to the Fibre Channel Switch standards.

"VC-RDY": A primitive used in the virtual lane environment and serves the same purpose as the R_RDY primitive.

To facilitate an understanding of the preferred embodiment, the general architecture and operation of a network system/network switch is described. The specific architecture and operation of the preferred embodiment will then be described with reference to the general architecture.

Networking systems may use standard or proprietary protocols or a combination for enabling network communication, for example, Infiniband ("IB"), Fibre Channel, FCOE or any other standard. These standards are incorporated herein by reference in their entirety. The following examples are based on IB and Fibre Channel standards; however the adaptive aspects described herein are not limited to any particular standard or protocol.

IB is a switched fabric interconnect standard for servers, incorporated herein by reference in its entirety. IB technology is deployed for server clusters/enterprise data centers ranging from two to thousands of nodes.

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

Fibre Channel fabric devices include a node port or "N_Port" that manages fabric connections. The N_port establishes a connection to a fabric element (e.g., a switch) having a fabric port or "F_port".

A Fibre Channel switch is a multi-port device where each port manages a point-to-point connection between itself and its attached system. Each port can be attached to a server, peripheral, I/O (input/output) subsystem, bridge, hub, router, or even another switch. A switch receives messages from one port and routes it to another port.

Network System:

FIG. 1A is a block diagram of a network system 100 implementing the methods and systems in accordance with the adaptive aspects of the present invention. Network system 100 may be based on Fibre Channel, IB or any other protocol. The examples below are described with respect to Fibre Channel but are applicable to IB and other network standards.

System 100 includes plural devices that are interconnected. Each device includes one or more ports, classified as for example, node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Figure 1B:
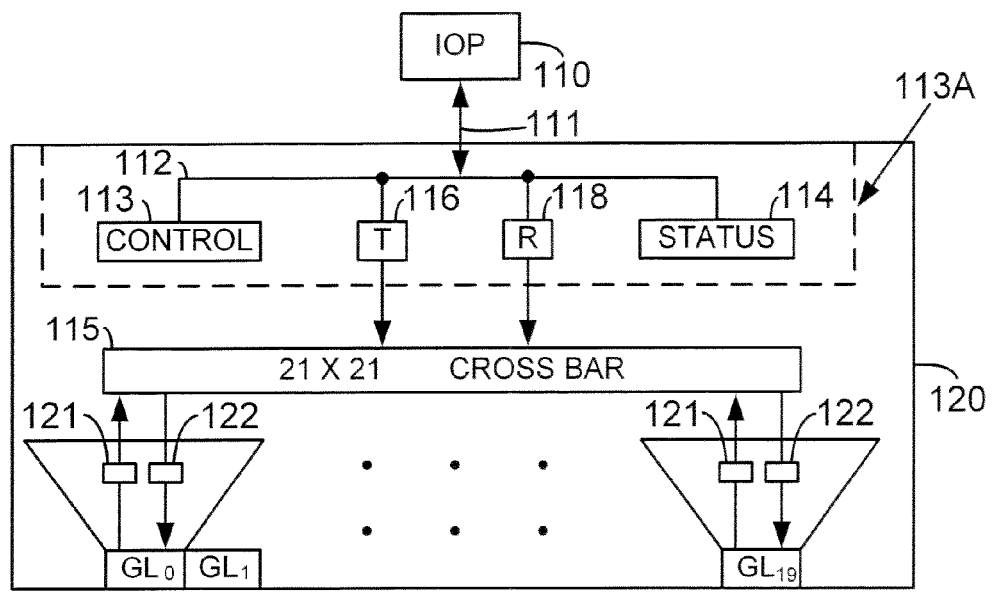
FIG. 1B shows an example of a Fibre Channel switch element, according to one embodiment of the present disclosure.

FIG. 1B is a block diagram of a 20-port ASIC Fabric switch element, used according to one aspect of the present invention. FIG. 1B provides the general architecture of a 20-channel switch chassis using the 20-port Fabric element. Fabric element includes ASIC 120 that supports non-blocking Fibre Channel class 2 (connectionless, acknowledged) service and class 3 (connectionless, unacknowledged) service between any ports. It is noteworthy that ASIC 120 may also be designed for class 1 (connection-oriented) service, within the scope and operation of the present invention as described herein.

The Fabric element of the present invention is presently implemented as a single CMOS ASIC, and for this reason the term "Fabric element" and ASIC are used interchangeably to refer to the preferred embodiments in this specification. Although FIG. 1B shows 20 ports, the present invention is not limited to any particular number of ports.

ASIC 120 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 120 in FIG. 1B. However, the ports may be located on both sides of ASIC 120 as shown in other Figures. This does not imply any difference in port or ASIC design. Actual physical layout of the ports will depend on the physical layout of the ASIC.

Each port GL0-GL19 includes transmit and receive connections to switch crossbar 115. Within each port, one connection is through receive buffer 121, which functions to receive and temporarily hold a frame during a routing operation. The other connection is through transmit buffer 122.

Switch crossbar 115 includes a number of switch crossbars for handling specific types of data and data flow control information. For illustration purposes only, switch crossbar 115 is shown as a single crossbar. Switch crossbar 115 is a connectionless crossbar (packet switch) of known conventional design, sized to connect 21×21 paths. This is to accommodate 20 GL ports plus a port for connection to a fabric controller, which may be external to ASIC 120.

In one aspect of the present invention, the switch chassis described herein, the Fabric controller is a firmware-programmed microprocessor, also referred to as the input/output processor ("IOP"). As seen in FIG. 1B, bi-directional connection to IOP 110 is routed through port 111, which connects internally to a control bus 112. Transmit buffer 116, receive buffer 118, control register 113 and Status register 114 (within block 113A) connect to bus 112. Transmit buffer 116 and receive buffer 118 connect the internal connectionless switch crossbar 115 to IOP 110 so that it can source or sink frames.

Control register 113 receives and holds control information from IOP 110, so that IOP 110 can change characteristics or operating configuration of ASIC 120 by placing certain control words in register 113. IOP 110 can read status of ASIC 120 by monitoring various codes that are placed in status register 114 by monitoring circuits (not shown).

Figure 1C:
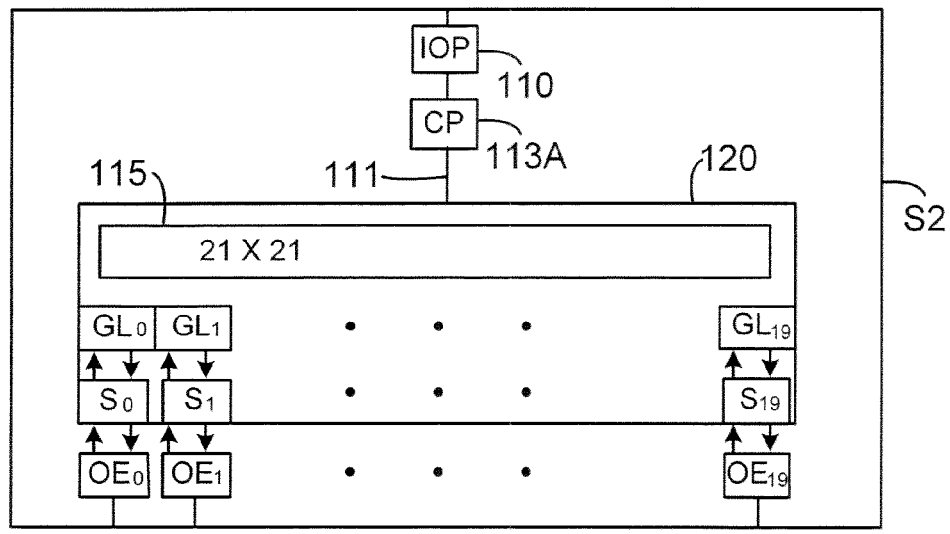
FIG. 1C shows a block diagram of a 20-channel switch chassis, according to one embodiment of the present disclosure.

FIG. 1C shows a 20-channel switch chassis S2 using ASIC 120 and IOP 110. IOP 110 in FIG. 1C is shown as a part of a switch chassis utilizing one or more of ASIC 120. S2 also includes other elements, for example, a power supply (not shown). The 20 GL_Ports correspond to channels C0-C19.

Each GL_Port has a serial/deserializer (SERDES) designated as S0-S19. Ideally, the SERDES functions are implemented on ASIC 120 for efficiency, but may alternatively be external to each GL_Port. The SERDES converts parallel data into a serial data stream for transmission and converts received serial data into parallel data.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
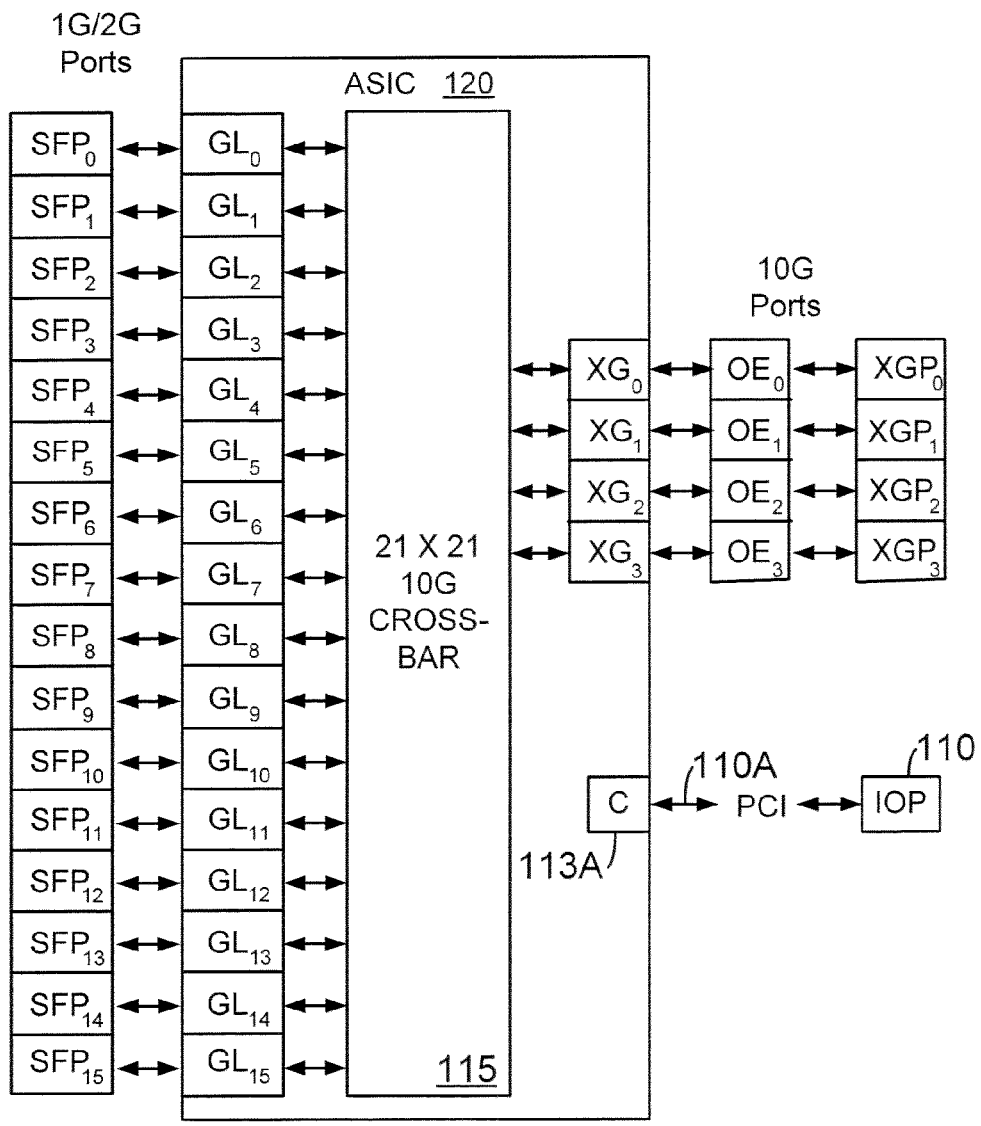
FIG. 1D shows another block diagram of a Fibre Channel switch element, according to one embodiment of the present disclosure.

FIG. 1D shows a block diagram of ASIC 120 with sixteen GL ports and four 10 G (Gigabyte) port control modules designated as XG0-XG3 for four 10 G ports designated as XGP0-XGP3. ASIC 120 include a control port 113A (that includes control register 113) that is coupled to IOP 110 through a PCI connection 110A.

Figure 1E:
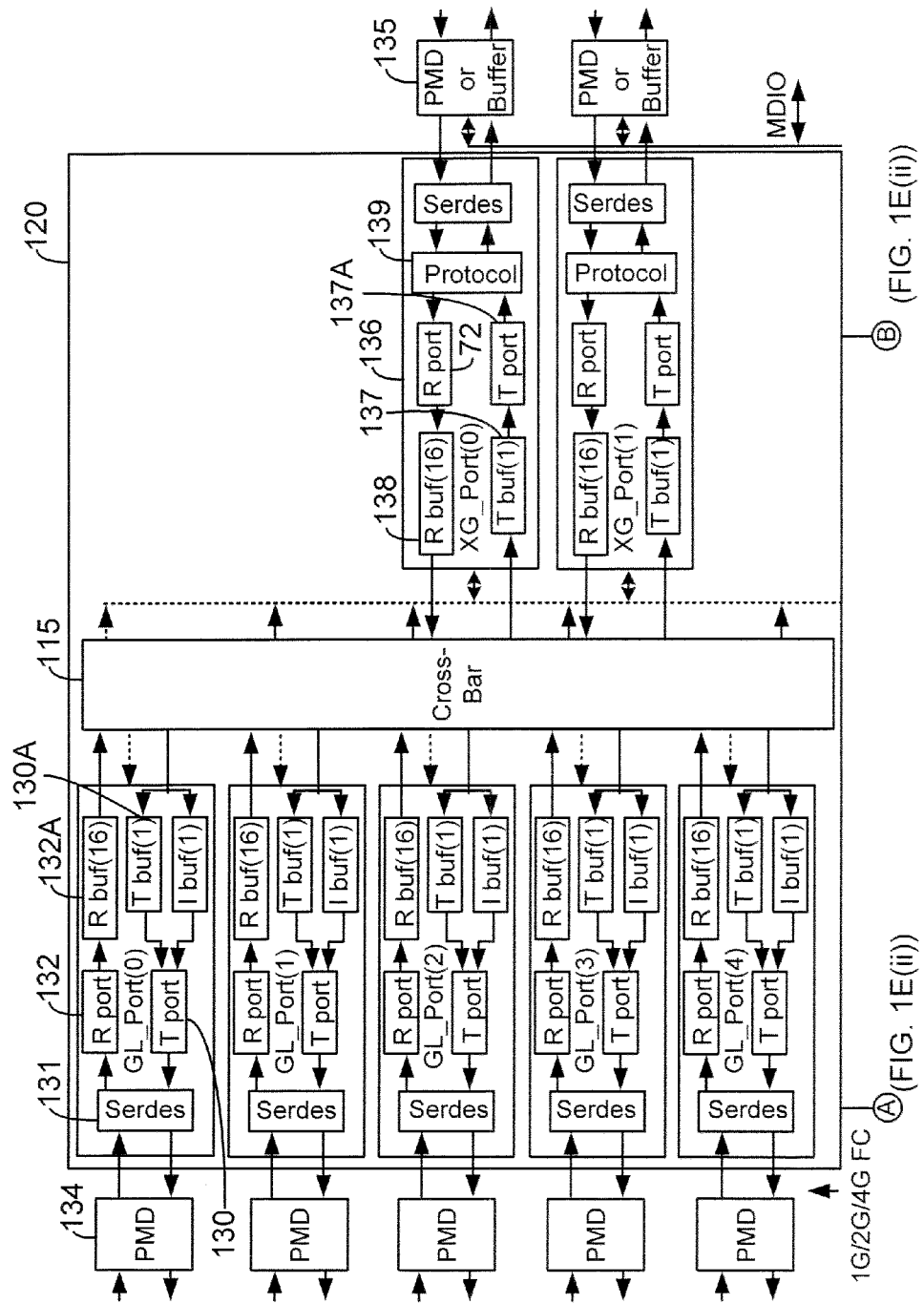
FIG. 1E shows a block diagram of a switch port using an address mapping cache, according to one embodiment of the present disclosure.

FIGS. 1E(i)/1E(ii) (jointly referred to as FIG. 1E) show yet another block diagram of ASIC 120 with sixteen GL and four XG port control modules. Each GL port control module has a Receive port (RPORT) 132 with a receive buffer (RBUF) 132A (similar to 121, FIG. 1B) and a transmit port 130 with a transmit buffer (TBUF) 130A (similar to 122, FIG. 1B) GL and XG port control modules are coupled to physical media devices ("PMD") 134 and 135 respectively.

Control port module 113A includes control buffers 113B and 113D for transmit and receive sides, respectively. Module 113A also includes a PCI interface module 113C that interfaces with IOP 110 via a PCI bus 110A. It is noteworthy that the present invention is not limited the PCI bus standard, any other protocol/standard may be used to interface control port 113A components with IOP 110.

XG_Port (for example 136) includes RPORT 138A with RBUF 138 similar to RPORT 132 and RBUF 132A and a TBUF 137 and TPORT 137A similar to TBUF 130A and TPORT 130. Protocol module 139 interfaces with SERDES to handle protocol based functionality.

Incoming frames are received by RPORT 132 via SERDES 131 and then transmitted using TPORT 130. Buffers (RBUF) 132A and (TBUF) 130A are used to stage frames in receive and transmit paths.

Figures 2A, 2B:
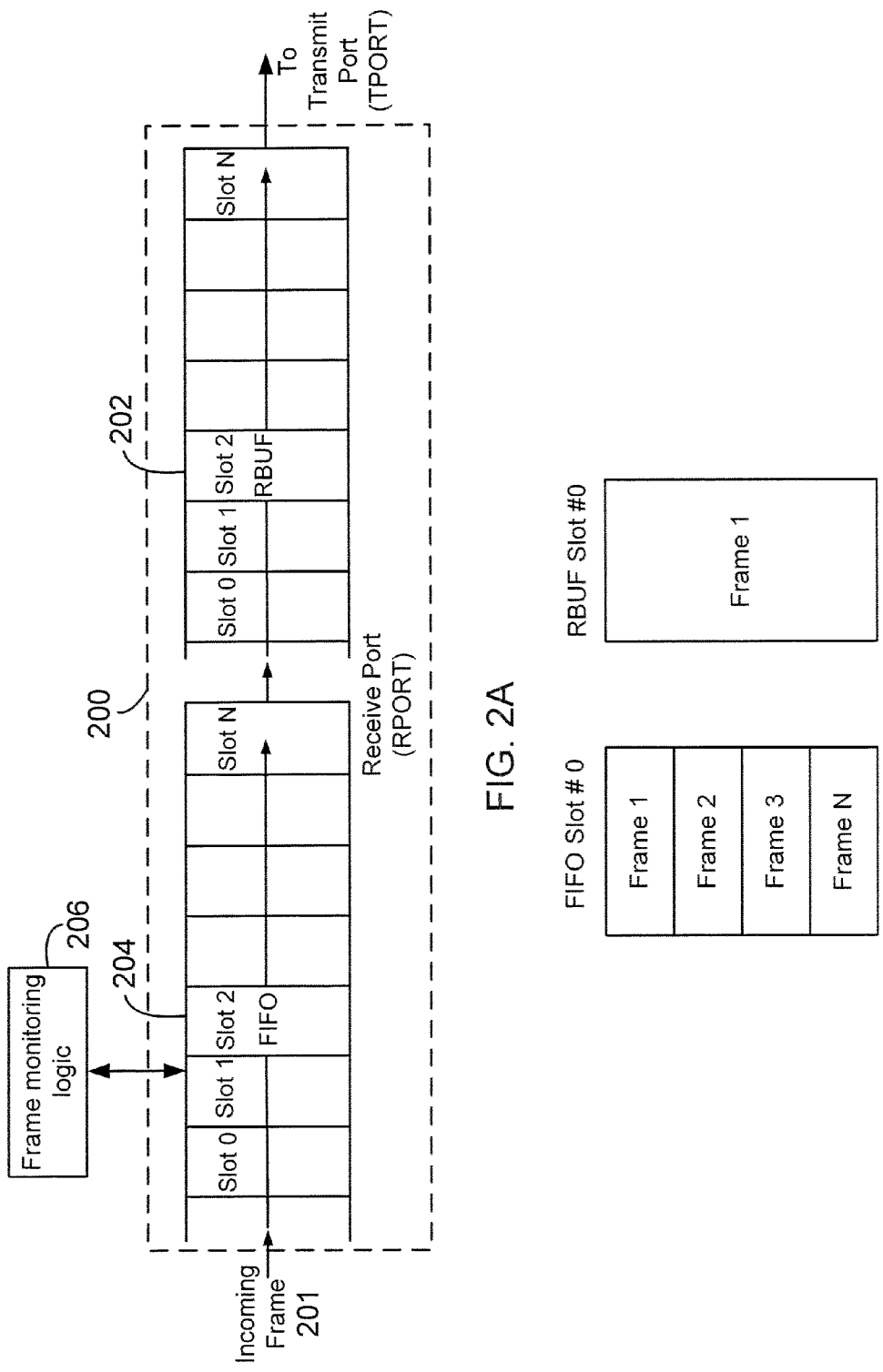
FIG. 2A shows a buffer structure according to one embodiment of the present disclosure.
FIG. 2B shows an example of frame allocation within two different memory structures, according to one embodiment of the present disclosure.

FIFO-RBUF Structure 200:

FIG. 2A shows a buffer structure 200 that improves buffer space utilization, according to one embodiment. Buffer structure 200 may be located at a receive port (e.g. 132 or 138A). Buffer 200 includes frame monitoring logic (also referred to as logic block) 206, a FIFO 204 and a receive buffer (RBUF) 202 (similar to RBUF 132A).

FIFO 204 provides memory storage space where more than one frame can be stored irrespective of the frame size. FIG. 2B shows a block diagram for a memory slot (FIFO Slot #0) of FIFO 204. Slot # 0 can store frames 1 to N as long as the total frame size does not exceed Slot #0 size. Slot #0 may be 2164 bytes to hold a maximum size Fibre Channel frame.

RBUF 202 also includes a plurality of slots (shown as Slot #0 to Slot #N). As shown in FIG. 2B, only one frame can be stored in each slot at any given time in RBUF slots. A typical slot in a RBUF 202 may be equal to 2164 bytes, the maximum Fibre Channel frame size. When a short frame, for example 256 bytes is stored in a 2164 byte slot, the buffer space is under utilized. The use of FIFO 204 solves this problem, as described below.

Buffer structure 200 may be implemented using a SRAM (Static Random Access Memory). The SRAM may include a single memory block that is logically divided into FIFO 204 and RBUF 202. A memory controller (not shown in FIG. 2A) may be used to divide the SRAM logically into FIFO 204 and RBUF 202. It is noteworthy that the adaptive embodiments disclosed herein are not limited to a SRAM implementation or to a single SRAM.

Logic block 206 monitors incoming frames 201 and determines frame types and frame length. The frame type and frame length may be determined by parsing a Fibre Channel frame header. Depending on the frame length some frames are stored in FIFO 204 and others are stored in RBUF 202. When frames are stored in FIFO 204, an early R_RDY can be sent by the switch, which improves overall frame transfer rate.

Fibre Channel uses credits and R_RDYs to pace frame flow and monitor buffer availability. Typically, the number of available credits is based on the number of available buffer slots in a receive buffer (for example RBUF 132A).

After a connection is established between two ports, the ports exchange information on the number of credits. When a receive port, for example RPORT 132, receives a frame, it stores the frame in a RBUF 132A slot and decrements the number of credits. When the frame is processed, a buffer slot is released. The receive port then sends a R_RDY and increments the credit counter.

The receive port also keeps track of the received frame and slot numbers in a separate buffer (referred to as a "RTAG") (not shown). The number of entries in RTAG increases with the number of switch ports and the number of RBUF slots. Therefore, managing RTAGS becomes complex as the number of slots in RBUF increases.

According to one embodiment, buffer structure 200 uses FIFO 204, which provides additional storage space. This reduces the number of slots that may be needed in a RBUF. For example, a conventional RBUF with 16 slots may be replaced by a FIFO 204 with 8 entries and a RBUF 202 with 8 entries. Hence, the number of slots in RBUF 202 is fewer than the number of slots in a conventional RBUF. The number of RTAGS also decreases due to a decrease in the number of RBUF slots. The switch port has fewer RTAGs to handle and this reduces complexity and size.

It is noteworthy that although the description herein, is based on R_RDYs, the present invention is not limited to R_RDYs. In an environment, where virtual lanes are used, the same mechanism/process can be used to handle VC_RDYs. The use of the term R_RDY throughout this specification is interchangeable with a VC_RDY.

Figure 2C:
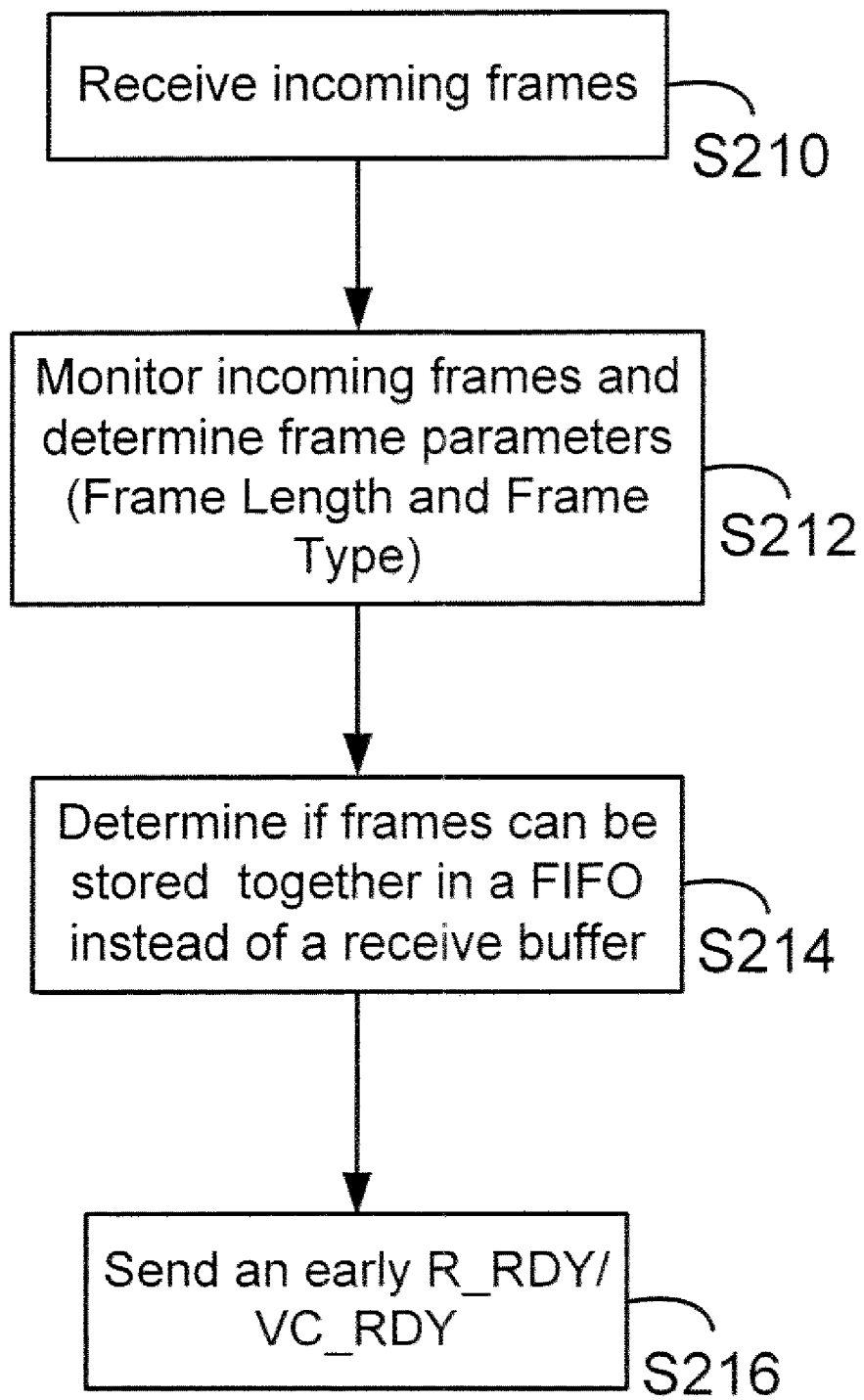
FIG. 2C shows a process flow diagram for credit management, according to one embodiment of the present disclosure.

Process Flow for Credit Management:

FIG. 2C shows a flow chart for credit management using the FIFO-RBUF buffer structure 200, according to one embodiment. In step S210, a receive port receives a frame 201. In step S212, Logic block 206 monitors the incoming frame and determines the frame length and frame type.

In step S214, logic block 206 determines if the received frame can be stored in FIFO 204 slot with another frame. For example, if the received frame is 1000 bytes in length and a previously stored frame is less than 1164 bytes (maximum size 2164–1000 bytes), then both the frames may be stored in the same slot, if the slot is 2164 bytes in size.

If the frame can be stored in FIFO 204, then in step S216, the receive port sends an early R_RDY instead of waiting for an available RBUF 202 slot. According to one embodiment, using FIFO 204 enables a receive port to send an early R_RDY and the port receiving the early R_RDY can immediately transmit one more frame. This improves the rate at which frames can be transferred between ports.

If the frame cannot be stored using FIFO 204 then it processed by using the receive buffer.

Using Credit Extender for Long Links:

Credit management (i.e. use of R_RDYs) affects the performance of a Fibre Channel system. This is especially important when long Fibre Channel links (for example, links extending to several kilometers) are used for communication. In an environment where long links are used, it is advantageous to frequently advertise more credit so that frame transfer occurs efficiently.

Credit management becomes even more significant when a large frame (for example, a frame that may be about 2000 bytes in size) is received over a long link. Since it takes a lot more time to process a large frame, smaller frames received after the large frame may fill up receive buffer slots in conventional switches. This may cause the buffer to fill up quickly. Buffer overflow can delay the transfer of frames. The delay can be severe for long links. The embodiments described below solve this problem by using FIFO 204 or an inline credit extender (ICE), or both FIFO 204 and ICE.

Figure 3A:
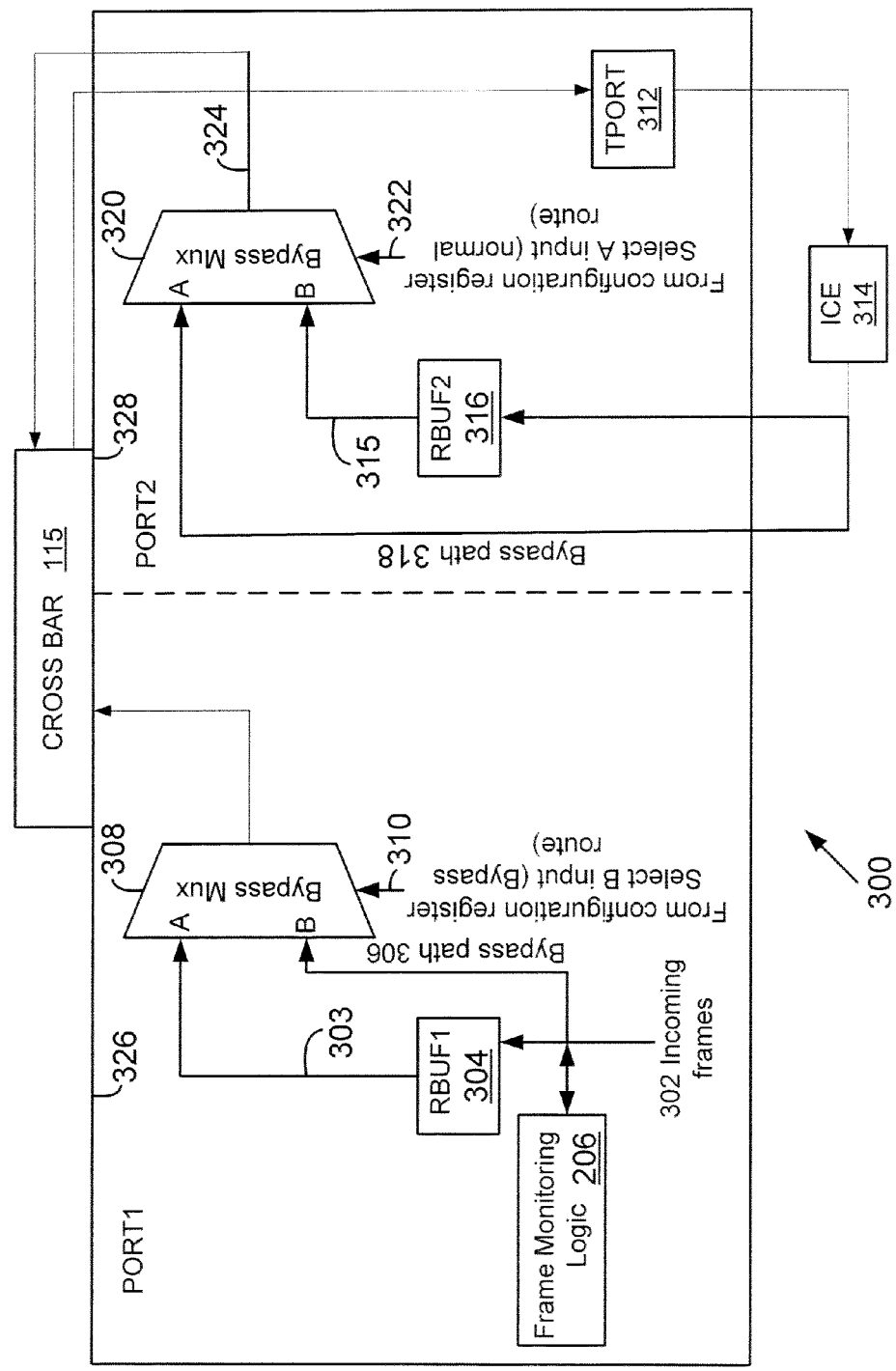
FIG. 3A shows a block diagram of a network device port structure using an in-line credit extender, according to one embodiment of the present disclosure.

FIG. 3A shows a block diagram of a system 300 for reducing buffer overflow conditions, according to one embodiment. FIG. 3A shows two switch ports Port 326 (Port1) and Port 328 (Port2) that can communicate using a cross bar 115. Port 326 and 328 each have a receive port (304 and 316) and a transmit port (only TPORT 312 is shown for Port 328). Port 328 may be coupled to an in-line credit extender (ICE) 314. ICE 314 provides additional storage space to receive and store frames. When ICE 314 is connected to a port, then the port can advertise additional credit. ICE 314 can be very useful for long link communication. The functionality of ICE 314 is described in detail in U.S. patent application Ser. No. 10/166,570 filed on Jun. 10, 2002, now U.S. Pat. No. 7,443,794; the disclosure of which is incorporated herein by reference in its entirety.

Besides other components, port 326 also includes a receive buffer (shown as RBUF1) 304, a bypass multiplexer (MUX) 308 and crossbar 115 and TPORT (not shown). When incoming frames 302 are received by port 326, the frames may be processed by the receive port or bypassed and processed by another port (for example, 328). A bypass path 306 may be used to process incoming frames 302 via MUX 308. A select signal 310 may be used to select frames via the bypass path 306. If the select signal 310 is not asserted, then input A (i.e. output 303 from RBUF1 304) is selected.

The select signal 310 may be based on a bit that is set in a configuration register (for example, control register 113, FIG. 1B). IOP 110 may set the bit.

The structure of Port 328 is similar to port 326. For example, receive buffer (RBUF2) 316, bypass Mux 320, bypass path 318 and signal 322 are similar to RBUF1 304, bypass MUX 308, bypass path 306 and signal 310, respectively.

The output of MUX 308 serves as an input to TPORT 312 via crossbar 115. The output of TPORT 312 may serve as an input to ICE 314. The output of ICE 314 is coupled to the input of RBUF2 316.

The output 315 of RBUF2 316 is coupled to one of the inputs of bypass MUX 320. The other input to MUX 320, input A, is a direct path from ICE 314. The output 324 of MUX 320 is coupled to the input of a destination TPORT 312 via a crossbar 115.

If PORT1 326 and PORT2 328 are used together to increase receive buffer credits, then when a frame 302 is received at the receive port, RBUF1 304 is bypassed using path 306 and the frame is sent to ICE 314 via crossbar 115 and TPORT 312.

A user using TOP 110 may configure multiplexer 308 via select signal 310 to use the bypass path 306. If PORT1 326 is not to be grouped with PORT2 328 then received frames use RBUF1 304 and the non-bypassed path 303. The incoming frame would then be routed to a different TPORT; not the TPORT in PORT2 328.

If the frame is bypassed and sent to ICE 314, then the frame may be sent to RBUF2 316. Select signal 322 may be used at MUX 320 to select output 315 from RBUF2 316. Thereafter, MUX 320 output 324 is sent to another port or the destination port or MUX 320 may select the bypass path 318 and route the frame to another port configured like PORT2 328, which is also connected to an additional ICE 314. This is done if more than two ports need to be grouped together.

Figure 3B:
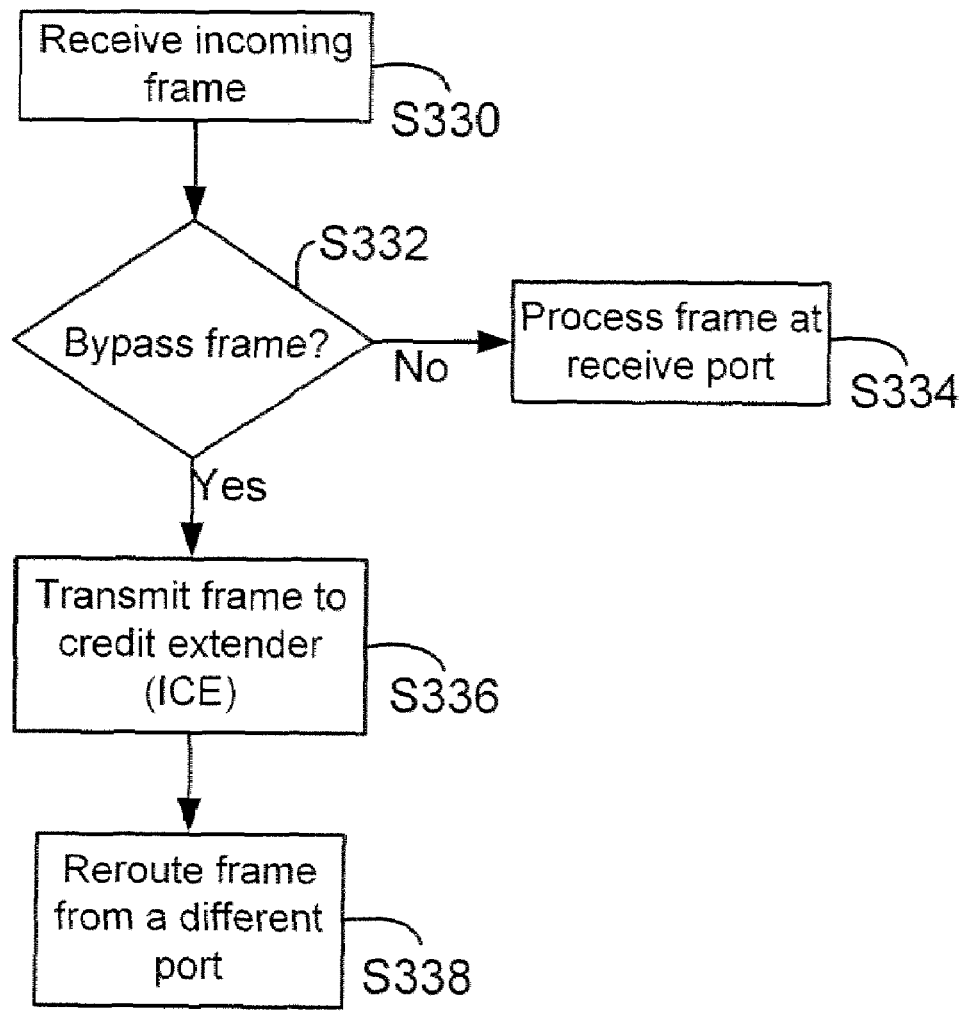
FIG. 3B shows another process flow diagram for extending credit according to an embodiment of the present disclosure.

FIG. 3B shows a flow chart for reducing buffer overflow caused by long and short frames, according to one embodiment. In step S330, an incoming frame is received. For example, frame 302 is received at port 326.

In step S332, the process determines if the frame should be processed via RBUF1 304 or bypassed and sent to ICE 314. This decision may be based on configuration register and the bypass path is enabled by signal 310. If the bypass path 306 is not enabled, then in step S334, the frame is processed at the receive port 326.

If the bypass path is enabled, then in step S336, the frame is sent to ICE 314 via TPORT 312. The frame bypasses receive port processing by selecting input B at MUX 308.

In step S338, the frame is re-routed through a different port. For example, the frame is transmitted to the destination port via port 328. In this example, ICE 314 sends the incoming frames to RBUF2 316. The select signal 322 selects input B, i.e. the output 315 from RBUF2 316 is used to process the frame.

The process flow and structure of FIG. 3A allows a user to optionally extend receive buffer credits for long distance links.

As mentioned above, the Fibre Channel example has been used to only illustrate the various embodiments. The buffer structure 200 and the process flow may be used in other network environments, including without limitation, Infini-Band, FCOE and others.

According to one aspect of the present invention, frames are rerouted through ICE 314 to a different port 328, thereby bypassing RBUF 304.

If an ICE module is not used, then the FIFO-RBUF structure 200 shown in FIG. 2A may be used to bypass receive buffer staging and processing by the receive port. In this example, incoming frames are moved from the FIFO 204 to another port, instead of being processed by the receiving port RBUF.

It is noteworthy, that the ICE 314 maybe located on the same ASIC, in the same package as the ASIC, located on the same printed circuit board as the ASIC, or on a pluggable module that is installed in place of the physical media device (PMD) 135.

Although the present invention has been described with reference to specific embodiments, these embodiments are illustrative only and not limiting. Many other applications and embodiments of the present invention will be apparent in light of this disclosure and the following claims.

What is claimed is:

1. A method for credit management in a network system, comprising:
   receiving an incoming frame at a receive port of a network device;
   determining a frame length of the incoming frame;
   based on the frame length, determining whether to store the frame in a first memory storage space or a second memory storage space, wherein the first memory storage space includes a plurality of slots and each of the plurality of slots can store only one frame regardless of frame size; and the second memory storage space includes a plurality of slots and each of the plurality of slots can store more than one frame; if the incoming frame is stored in the second memory storage space, transmitting a signal immediately to another port indicating that credit is available; and if the incoming frame is stored in the first memory storage space, transmitting a signal to another port indicating that credit is available only after a frame has been processed so that a slot is released from the first memory storage space.

2. The method of claim 1, wherein the first memory storage space is a receive buffer at a receive port of a network switch and the second memory storage space is a first-in-first out buffer (FIFO) at the receive port.

3. The method of claim 2, wherein the network switch is a Fibre Channel switch.

4. The method of claim 3, wherein the signal indicating credit is a R_RDY primitive used in a Fibre Channel network.

5. The method of claim 3, wherein the signal indicating credit is a VC_RDY primitive used in a Fibre Channel network that supports virtual lanes.

6. The method of claim 1, wherein a frame monitoring logic monitors the incoming frame and based on frame size determines if the incoming frame can be stored in the second memory storage space.

7. The method of claim 1, wherein the network switch is one or more of an InfiniBand switch and an Ethernet switch.

8. A buffer structure for a network port, comprising:
   a frame monitoring logic for monitoring and determining a frame length of an incoming frame received at the network port;
   a first memory storage space that includes a plurality of slots, where each of the plurality of slots can store only one frame regardless of frame size; and
   a second memory storage space that includes a plurality of slots, where each of the plurality of slots can store more than one frame; wherein depending on the frame length, the incoming frame is either stored in the first memory storage space or the second memory storage space; if the incoming frame is stored in the second memory storage space, a signal is immediately transmitted to another port indicating that credit is available to store more frames; and if the incoming frame is stored in the first memory storage space, transmitting a signal to another port indicating that credit is available to store more frames only after a frame has been processed so that a slot is released from the first memory storage space.

9. The structure of claim 8, wherein the first memory storage space is a receive buffer at a receive port of a network switch and the second memory storage space is a first-in-first out buffer (FIFO) at the receive port.

10. The structure of claim 9, wherein the network switch is a Fibre Channel switch.

11. The structure of claim 9, wherein the network switch is a Ethernet switch.

12. The structure of claim 10, wherein the signal indicating credit is a R_RDY primitive used in a Fibre Channel network.

13. The structure of claim 12, wherein the signal indicating credit is a VC_RDY primitive used in a Fibre Channel network that supports virtual lanes.

14. The structure of claim 8, wherein the network port is a part of an InfiniBand switch.

* * * * *

UNITED STATES PATENT AND TRADEMARK OFFICE
CERTIFICATE OF CORRECTION

PATENT NO. : 7,609,710 B1  Page 1 of 1
APPLICATION NO. : 12/019094
DATED : October 27, 2009
INVENTOR(S) : Frank R. Dropps et al.

It is certified that error appears in the above-identified patent and that said Letters Patent is hereby corrected as shown below:

In the Specifications:

In column 5, line 48, delete "1B) GL" and insert -- 1B). GL --, therefor.

In column 8, line 22, delete "TOP" and insert -- IOP --, therefor.

Signed and Sealed this

Nineteenth Day of October, 2010

David J. Kappos
*Director of the United States Patent and Trademark Office*